(12) United States Patent
Kim et al.

(10) Patent No.: US 9,600,708 B2
(45) Date of Patent: Mar. 21, 2017

(54) TRANSPARENT FINGERPRINT RECOGNIZING SENSOR ARRAY

(71) Applicant: SILICON DISPLAY TECHNOLOGY, Yongin-si, Gyeonggi-do (KR)

(72) Inventors: Ki Joong Kim, Suwon-si (KR); Ji Ho Hur, Yongin-si (KR); Yong Ju Ham, Bucheon-si (KR); Bong Yeob Hong, Hwaseong-si (KR); Youn Duck Nam, Gwangmyeong-si (KR)

(73) Assignee: SILICON DISPLAY TECHNOLOGY, Yonginsi (KR)

( * ) Notice: Subject to any disclaimer, the term of this patent is extended or adjusted under 35 U.S.C. 154(b) by 0 days.

(21) Appl. No.: 14/762,499

(22) PCT Filed: Oct. 31, 2013

(86) PCT No.: PCT/KR2013/009798
§ 371 (c)(1),
(2) Date: Jul. 22, 2015

(87) PCT Pub. No.: WO2014/115957
PCT Pub. Date: Jul. 31, 2014

(65) Prior Publication Data
US 2015/0356340 A1 Dec. 10, 2015

(30) Foreign Application Priority Data

Jan. 28, 2013 (KR) .................. 10-2013-0009232

(51) Int. Cl.
*G06K 9/00* (2006.01)

(52) U.S. Cl.
CPC ....... *G06K 9/00053* (2013.01); *G06K 9/0002* (2013.01); *G06K 9/00026* (2013.01)

(58) Field of Classification Search
CPC .................. G06K 9/00053; G06K 9/0002
USPC .......................................... 382/124
See application file for complete search history.

(56) References Cited

U.S. PATENT DOCUMENTS

2005/0213799 A1* 9/2005 Sawano ............... G06K 9/0002
382/124

FOREIGN PATENT DOCUMENTS

| KR | 10-2006-0044716 A | 5/2006 |
| KR | 10-2012-0111960 A | 10/2012 |
| KR | 10-2012-0138887 A | 12/2012 |
| KR | 10-1210474 B1 | 12/2012 |

OTHER PUBLICATIONS

International Search Report dated Mar. 27, 2014 issued in Application No. PCT/KR2013/009798.

* cited by examiner

*Primary Examiner* — Ruiping Li
(74) *Attorney, Agent, or Firm* — Lex IP Meister, PLLC (57) ABSTRACT

Provided is a transparent fingerprint recognizing sensor array, including: a pixel driving circuit formed on a substrate; an antistatic wiring disposed in an upper part of the pixel driving circuit; and a pixel electrode connected to the pixel driving circuit, wherein the pixel electrode is made of a transparent material or has an open formed in a center part thereof.

10 Claims, 6 Drawing Sheets

TRANSPARENT FINGERPRINT RECOGNIZING SENSOR ARRAY

CROSS-REFERENCE TO RELATED PATENT APPLICATIONS

This application is a U.S. National Stage Application under 35 U.S.C. §371 of PCT Application No. PCT/KR2013/009798, filed Oct. 31, 2013, which claims priority to Korean Patent Application No. 10-2013-0009232, filed Jan. 28, 2013, whose entire disclosures are hereby incorporated by reference.

TECHNICAL FIELD

The present invention relates to a transparent fingerprint recognizing sensor array, and more specifically, to a sensor array capable of performing fingerprint recognition.

BACKGROUND ART

In general, a capacitive-type fingerprint sensor array recognizes fingerprints in such a manner that when a users fingerprint comes into contact with a protective film disposed on a pixel electrode (sensing electrode), a difference in capacitance is generated depending on the unevenness of a fingerprint, and a pixel circuit detects the difference.

Figure 1:
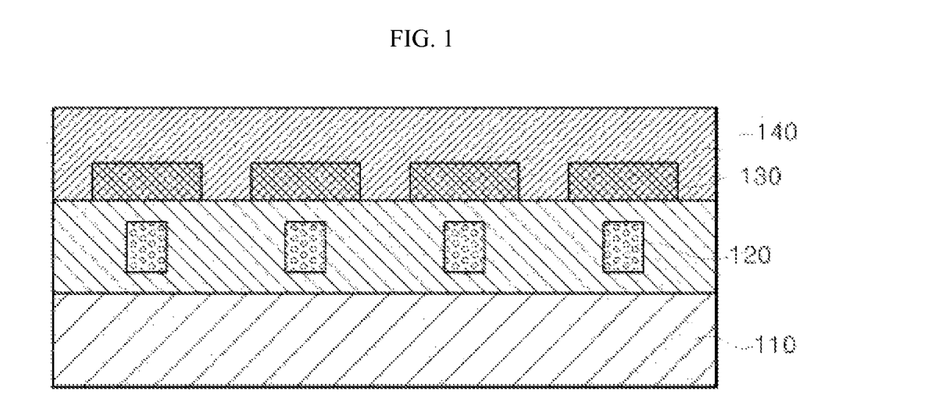
FIG. 1 and FIG. 2 are cross-sectional views of a sensor array according to a conventional art.
Figure 2:
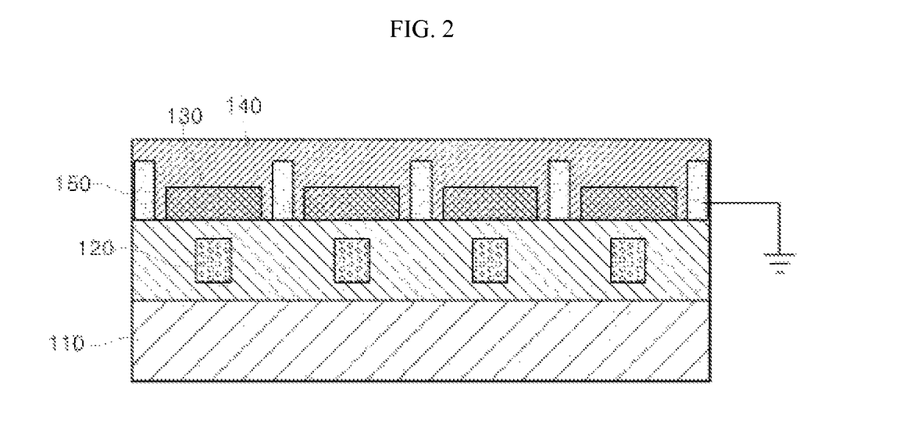

FIG. 1 and FIG. 2 are cross-sectional views of a sensor array according to a conventional art.

As illustrate in FIG. 1, a structure of the conventional sensor array includes a substrate 110, a pixel circuit 120, a pixel electrode (sensing electrode) 130, and a protective layer 140.

In general, the pixel circuit 120 is composed of a transistor, and the pixel electrode (sensing electrode) 130 is located at the top of the pixel circuit 120, so that a signal (a difference in capacitance) can be transmitted to the pixel circuit 120.

In the sensor array illustrated in FIG. 1, when the users finger comes into contact with the protective film formed on the pixel electrode (sensing electrode) 130, static electricity charged in the human body is discharged to the pixel electrode (sensing electrode) 130, and due to the static electricity, the pixel circuit 120 may be monetarily damaged or may have a reduced function.

To solve this problem, as illustrated in FIG. 2, in the conventional art, a method in which an antistatic wiring 150 is located higher than the pixel electrode 130 was used in order to protect the pixel electrode.

However, due to the elements such as the pixel electrode (sensing electrode) and the antistatic wiring, the conventional art is problematic in that the visibility of a display disposed in a lower part of the sensor array is reduced.

DISCLOSURE

Technical Problem

Accordingly, the present invention has been made keeping in mind the above problems occurring in the related art. An aspect of the present invention provides a transparent fingerprint recognizing sensor array which is configured such that a pixel electrode is made of a transparent material or has an open formed in a center part thereof, and a substrate of the sensor array is composed of a transparent substrate so that light transmittance of the sensor array can be secured, and the visibility of a display can be secured when the sensor array is connected to the display of a display device.

Technical Solution

According to an aspect of one exemplary embodiment of the present invention, there is provided a transparent fingerprint recognizing sensor array, including: a pixel driving circuit formed on a substrate; an antistatic wiring disposed in an upper part of the pixel driving circuit; and a pixel electrode connected to the pixel driving circuit, wherein the pixel electrode is made of a transparent material or has an open formed in a center part thereof.

According to another exemplary embodiment of the present invention, the pixel electrode may have a quadrangular open formed in a center part thereof.

According to still another exemplary embodiment of the present invention, the pixel electrode may be composed of a photo sensor.

According to still further another exemplary embodiment of the present invention, the pixel electrode may be configured to be embedded along with the pixel driving circuit in an insulating layer in which the pixel driving circuit is embedded.

According to still further another exemplary embodiment of the present invention, the pixel electrode may be configured to be embedded along with the antistatic wiring in a protective layer in which the antistatic wiring is embedded.

According to still further another exemplary embodiment of the present invention, in the sensor array, the pixel electrode may be formed in the same layer as a layer in which the pixel driving circuit or the antistatic wiring is formed.

According to still further another exemplary embodiment of the present invention, the photo sensor may be composed of any one of an amorphous silicon photodiode, an organic photo sensor and a quantum dot.

According to still further another exemplary embodiment of the present invention, the substrate may be composed of a transparent substrate made of a transparent material.

According to still further another exemplary embodiment of the present invention, the substrate may be composed of any one of a substrate formed by coating an insulating film on a meal substrate, and an insulating substrate.

According to still further another exemplary embodiment of the present invention, the antistatic wiring may be made of any one material of a metal, a metal oxide and a conductive organic material.

According to still further another exemplary embodiment of the present invention, the pixel driving circuit may include a thin film transistor, and an active layer of the thin film transistor may be formed of any one of amorphous silicon, polycrystalline silicon, and an oxide semiconductor.

Advantageous Effects

According to the embodiments of the present invention, the pixel electrode is made of the transparent material or the open is formed in the center part thereof, and the substrate of the sensor array is composed of the transparent substrate, thereby securing higher light transmittance of the sensor array.

Also, according to the embodiments of the present invention, when the transparent fingerprint recognizing sensor array is connected to the display of a display device, visibility of the display can be secured.

DESCRIPTION OF DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

MODE FOR INVENTION

Hereinafter, exemplary embodiments of the present invention will be described in detail with reference to the accompanying drawings. In the following description, it is to be noted that, when the functions of conventional elements and the detailed description of elements related with the present invention may make the gist of the present invention unclear, a detailed description of those elements will be omitted. Further, it should be understood that the shape and size of the elements shown in the drawings may be exaggeratedly drawn to provide an easily understood description of the structure of the present invention rather than reflecting the actual sizes of the corresponding elements.

Figure 3:
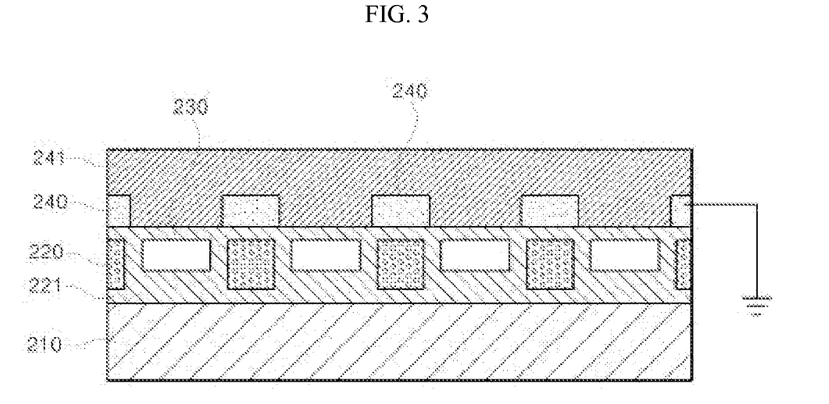
FIG. 3 is a cross-sectional view of a transparent fingerprint recognizing sensor array according to one exemplary embodiment of the present invention.

FIG. 3 is a cross-sectional view of a transparent fingerprint recognizing sensor array according to one exemplary embodiment of the present invention.

A transparent fingerprint recognizing sensor array according to one exemplary embodiment of the present invention includes: a substrate 210; a pixel driving circuit 220; a pixel electrode 230; and an antistatic wiring 240.

The pixel driving circuit 220 is formed on the substrate 210, and at this time, the pixel driving circuit 220 includes a thin film transistor. An active layer of the thin film transistor is formed of any one of amorphous silicon, polycrystalline silicon and an oxide semiconductor.

The antistatic wiring 240 is disposed in an upper part of the pixel driving circuit 220. At this time, the antistatic wiring 240 is made of any one material of a metal, a metal oxide and a conductive organic material.

The pixel electrode 230 is connected to the pixel driving circuit 220 and is driven by the pixel driving circuit 220.

At this time, in the exemplary embodiment of FIG. 3, the pixel electrode 230 is made of a transparent material. Also, the pixel electrode 230 may be made of various conductive transparent materials such as a metal or a metal oxide.

As described above, in a case where the pixel electrode 230 is made of the transparent material, higher light transmittance of the sensor array can be secured, and thus when the transparent fingerprint recognizing sensor is connected to a display, visibility of the display can be secured.

An insulating layer 221 is configured to cover the pixel driving circuit 220 and the pixel electrode 230 formed on the substrate 210.

At this time, the pixel electrode 230 may be configured to be embedded in the insulating layer 221 along with the pixel driving circuit 220, and the antistatic wiring 240 may be disposed in an upper part of the pixel driving circuit 220 to be embedded in a protective layer 241.

Thus, the pixel electrode 230 and the pixel driving circuit 220 are disposed not to overlap each other, and the antistatic wiring 240 is disposed to overlap the upper part of the pixel driving circuit 220.

In the present embodiment of the invention, the overlapping refers to an arrangement structure which has no overlapping arrangement on the plane when seen from a vertical direction. That is, as shown through the arrangement of FIG. 3, the pixel driving circuit 220 and the pixel electrode 230 are disposed so as not to have parts which overlap each other in a vertical direction, and thus are configured in a structure in which they do not overlap each other.

The substrate 210 is made of a transparent material. At this time, the substrate 210 is composed of an insulating substrate or a substrate formed by coating an insulating film on a metal substrate.

As described above, in the case where the substrate 210 is made of the transparent material, higher light transmittance of the sensor array can be secured. Thus, when the transparent fingerprint recognizing sensor array is connected to a display, visibility of the display can be secured.

Figure 4:
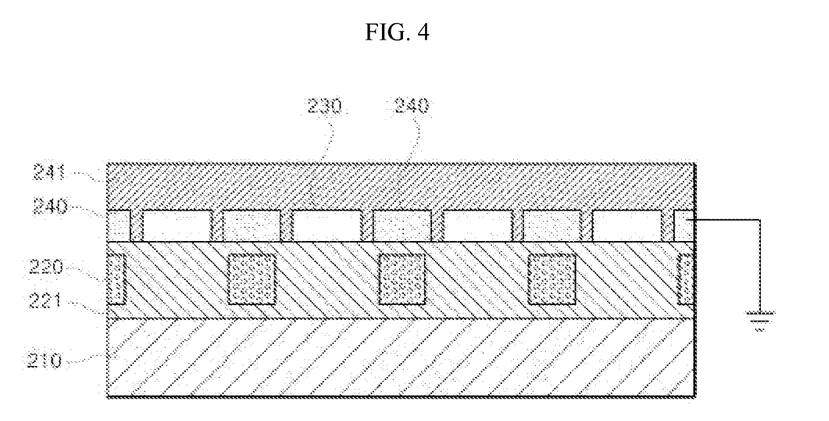
FIG. 4 is a cross-sectional view of a transparent fingerprint recognizing sensor array according to another exemplary embodiment of the present invention.

FIG. 4 is a cross-sectional view of a transparent fingerprint recognizing sensor array according to another exemplary embodiment of the present invention.

The configuration shown in the exemplary embodiment of FIG. 4 is similar to that shown in the exemplary embodiment of FIG. 3, but in the configuration, only the pixel driving circuit 220 is embedded in the insulating layer 221, and the pixel electrode 230 and the antistatic wiring 240 are embedded in the protective layer 241.

Thus, the pixel electrode 230 and the pixel driving circuit 220 are disposed not to overlap each other, and the antistatic wiring 240 is disposed to overlap the upper part of the pixel driving circuit 220.

Also, even in the exemplary embodiment of FIG. 4, the pixel electrode 230 is made of a transparent material. Also, the pixel electrode 230 may be made of various conductive transparent materials such as a metal or a metal oxide.

As described above, in a case where the pixel electrode 230 is made of the transparent material, and the substrate is also made of the transparent material, the higher light transmittance of the sensor array can be secured, and thus the visibility of the display can be secured when the transparent fingerprint recognizing sensor is connected to the display.

Figure 5:
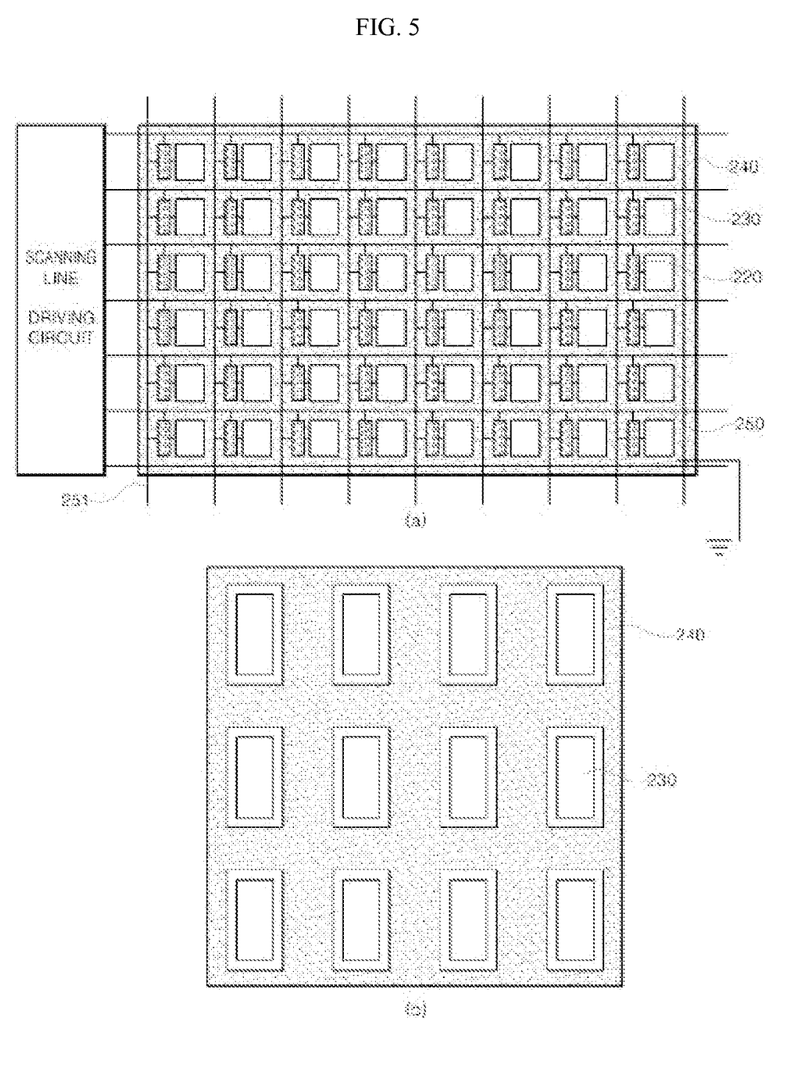
FIG. 5 is a top view of each of the transparent fingerprint recognizing sensor arrays according to the exemplary embodiments of FIG. 3 and FIG. 4.

FIG. 5 is a top view of each of the transparent fingerprint recognizing sensor arrays according to the exemplary embodiments of FIG. 3 and FIG. 4.

As illustrated in (a) of FIG. 5, the antistatic wiring 240 is formed all over the surface of the transparent fingerprint recognizing sensor array in a grid form. The antistatic wiring 240 configured in such a grid form is formed in a structure which covers the upper part of the pixel driving circuit 220 composed of signal wirings 250 and 251, and a thin film transistor.

The pixel electrode 230 is separated from the antistatic wiring 240 at a regular interval, and is made of a transparent material.

Reviewing it more specifically, as illustrated in (b) of FIG. 5, the transparent fingerprint recognizing sensor array is configured such that the antistatic wiring 240 is disposed in the grid form which surrounds around the pixel electrode 230 at a regular interval.

At this time, according to the one exemplary embodiment of the present invention, since the pixel electrode 130 is made of various conductive transparent materials, the visibility of the display can be secured when the transparent fingerprint recognizing sensor array is connected to the display.

Figure 6:
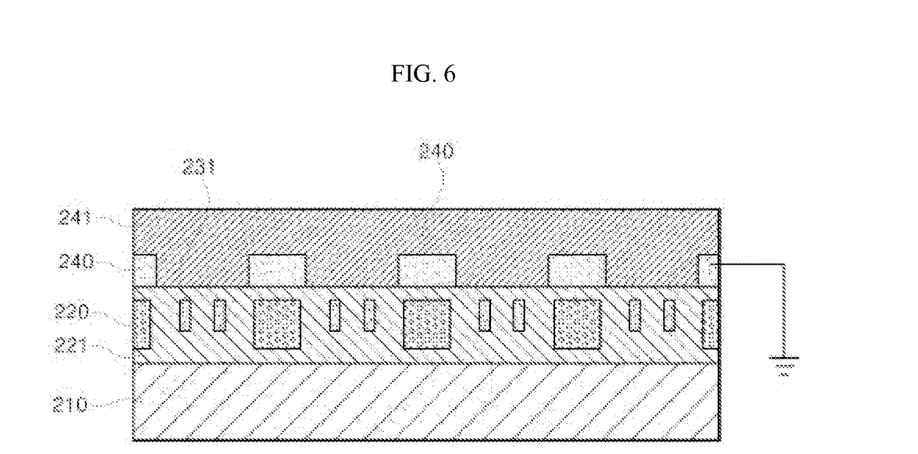
FIG. 6 is a cross-sectional view of a transparent fingerprint recognizing sensor array according to still another exemplary embodiment of the present invention.

FIG. 6 is a cross-sectional view of a transparent fingerprint recognizing sensor array according to still another exemplary embodiment of the present invention.

Like that of the exemplary embodiment of FIG. 3, the transparent fingerprint recognizing sensor array 210 according to the exemplary embodiment of FIG. 6 is configured to include: the substrate 210; the pixel driving circuit 220; the pixel electrode 230; and the antistatic wiring 240.

That is, the pixel driving circuit 220 is formed on the substrate 210, the antistatic wiring 240 is disposed in the upper part of the pixel driving circuit 220, and the pixel electrode 230 is connected to the pixel driving circuit 220 and is driven by the pixel driving circuit 220.

At this time, in the exemplary embodiment of FIG. 6, when seen from an upper surface of the transparent fingerprint recognizing sensor array, the open is formed in the center part of the pixel electrode 120 so that the visibility of the display can be secured when the transparent fingerprint recognizing sensor array is connected to the display.

Also, the pixel electrode 231 is configured to be embedded in the insulating layer 221 along with the pixel driving circuit 220, and the antistatic wiring 240 is disposed in the upper part of the pixel driving circuit 220 to be embedded in the protective layer 241. Thus, the pixel electrode 231 and the pixel driving circuit 220 are disposed not to overlap each other, and the antistatic wiring 240 is disposed to overlap the upper part of the pixel driving circuit 220.

Furthermore, the substrate 210 is made of the transparent material so that the higher light transmittance of the sensor array can be secured, and thus when the transparent fingerprint recognizing sensor array is connected to the display, the visibility of the display can be secured.

Figure 7:
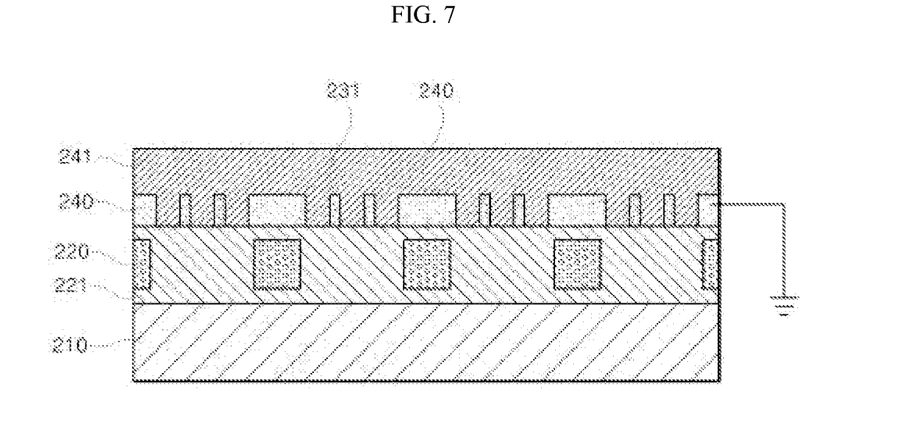
FIG. 7 is a cross-sectional view of a transparent fingerprint recognizing sensor array according to still further another exemplary embodiment of the present invention.

FIG. 7 is a cross-sectional view of a transparent fingerprint recognizing sensor array according to still further another exemplary embodiment of the present invention.

In the exemplary embodiment of FIG. 7, only the pixel driving circuit 220 may be configured to be embedded in the insulating layer 221, and the pixel electrode 231 and the antistatic wiring 240 may be configured to be embedded in the protective layer 241.

Accordingly, the pixel electrode 231 and the pixel driving circuit 220 are disposed not to overlap each other, and the antistatic wiring 240 is disposed to overlap the upper part of the pixel driving circuit 220.

Like the exemplary embodiment of FIG. 6, in the exemplary embodiment of FIG. 7, when seen from the upper surface of the transparent fingerprint recognizing sensor array, the pixel electrode 231 may have the open formed in the center part thereof, and at this time, the pixel electrode 231 may be composed of a photo sensor.

As such, when the open is formed in the center part of the pixel electrode 231, the higher light transmittance of the sensor array can be secured. Thus, it is effective to secure the visibility of the display when the transparent fingerprint recognizing sensor array is connected to the display.

Figure 8:
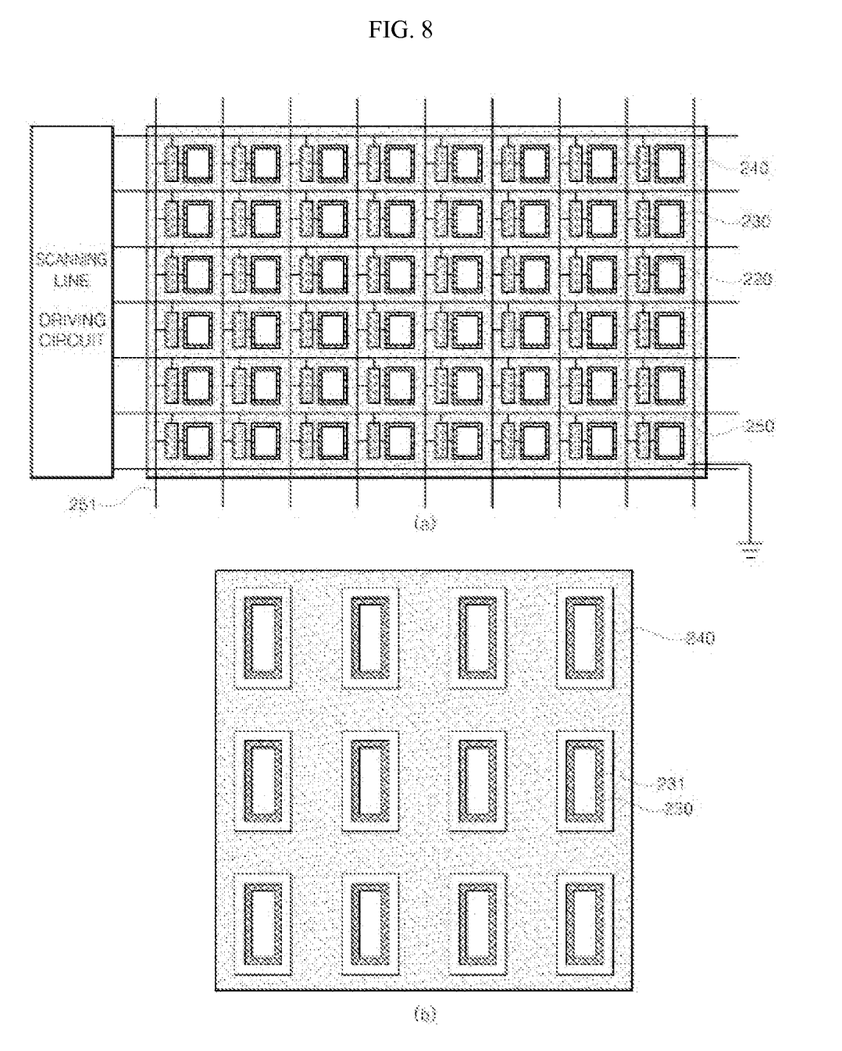
FIG. 8 is a top view of each of the transparent fingerprint recognizing sensor arrays according to the exemplary embodiments of FIG. 6 and FIG. 7.

FIG. 8 is a top view of each of the transparent fingerprint recognizing sensor arrays according to the exemplary embodiments of FIG. 6 and FIG. 7.

As illustrated in (a) of FIG. 8, the antistatic wiring 240 is formed all over the surface of the transparent fingerprint recognizing sensor array in the grid form, and is formed in a structure which covers the upper part of the pixel driving circuit 220 composed of the signal wirings 250 and 251, and the thin film transistor.

The pixel electrode 230 is configured to be separated from the antistatic wiring 240 at a regular interval.

Reviewing it more specifically, as illustrated in (b) of FIG. 8, the transparent fingerprint recognizing sensor array is configured such that the antistatic wiring 240 is disposed to surround around the pixel electrode 230 in a grid form at a regular interval.

At this time, according to the one exemplary embodiment of the invention, when seen from the upper surface of the transparent fingerprint recognizing sensor array, the pixel electrode 230 has the open formed in the center part thereof so that the visibility of the display disposed at a lower part of the transparent fingerprint recognizing sensor array can be secured.

Meanwhile, the pixel electrode 230 may be composed of the photo sensor, and the photo sensor may be composed of any one of an amorphous silicon photodiode, an organic photo sensor, and a quantum dot.

Figure 9:
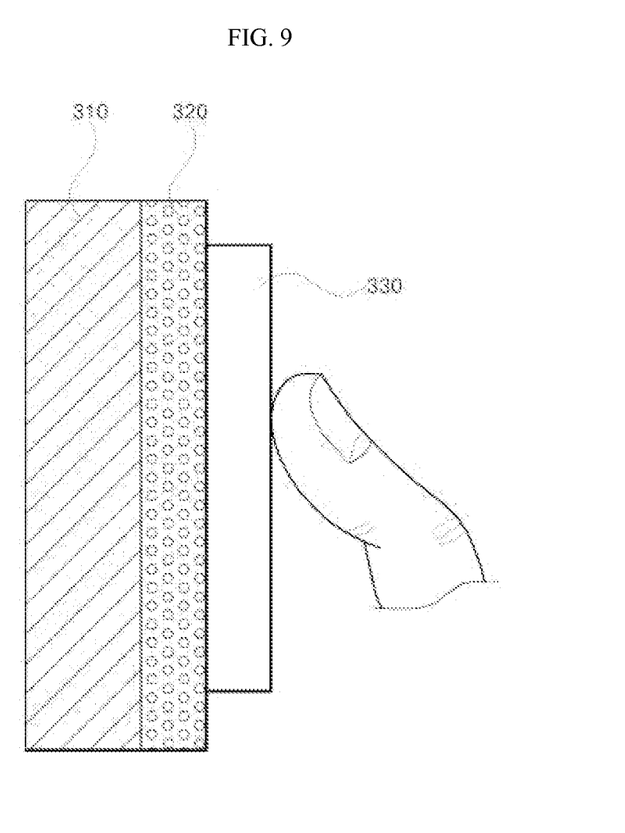
FIG. 9 is a view illustrating a cross-section in which the transparent fingerprint recognizing sensor array according to the one exemplary embodiments of the present invention is connected to a display.

FIG. 9 is a view illustrating a cross-section in which the transparent fingerprint recognizing sensor array according to the one exemplary embodiments of the present invention is connected to a display.

As shown in the one exemplary embodiment of the present invention, the pixel electrode is made of a transparent material, or has the open formed in the center part thereof. Also, when the substrate of the transparent fingerprint recognizing sensor array is composed of a transparent substrate, the higher light transmittance of the transparent fingerprint recognizing sensor array 330 can be secured. Thus, when the transparent fingerprint recognizing sensor array 330 is connected to a display 320 of a display device 310, the visibility of the display can be effectively secured.

The exemplary embodiments are disclosed in the drawings and the specification. The specific terms used herein are for the purpose of describing particular embodiments only and are not intended to be limiting of example embodiments. Thus, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. A transparent fingerprint recognizing sensor array, comprising:
 a pixel driving circuit formed on a substrate;
 an antistatic wiring disposed in an upper part of the pixel driving circuit; and
 a pixel electrode connected to the pixel driving circuit,
 wherein the pixel electrode is made of a transparent material or has a quadrangular open formed in a center part thereof.

2. The sensor array of claim 1, wherein the pixel electrode is composed of a photo sensor.

3. The sensor array of claim 1, wherein the pixel electrode is configured to be embedded along with the pixel driving circuit in an insulating layer in which the pixel driving circuit is embedded.

4. The sensor array of claim 1, wherein the pixel electrode is configured to be embedded along with the antistatic wiring in a protective layer in which the antistatic wiring is embedded.

5. The sensor array of claim 1, wherein the pixel electrode is formed in the same layer as a layer in which the pixel driving circuit or the antistatic wiring in the transparent fingerprint recognizing sensor array is formed.

6. The sensor array of claim 2, wherein the photo sensor is composed of any one of an amorphous silicon photodiode, an organic photo sensor and a quantum dot.

7. The sensor array of claim 1, wherein the substrate is made of a transparent material.

8. The sensor array of claim 1, wherein the substrate is any one of a substrate formed by coating an insulating film on a metal substrate, and an insulating substrate.

9. The sensor array of claim 1, wherein the antistatic wiring is made of any one material of a metal, a metal oxide and a conductive organic material.

10. The sensor array of claim 1, wherein the pixel driving circuit comprises a thin film transistor, and an active layer of the thin film transistor is made of any one of amorphous silicon, polycrystalline silicon and an oxide semiconductor.

* * * * *